US012359795B2

(12) United States Patent
Zhang

(10) Patent No.: US 12,359,795 B2
(45) **Date of Patent: *Jul. 15, 2025**

(54) LINEAR BAY LIGHT FIXTURE

(71) Applicant: Green Creative, LTD, Hong Kong (CN)

(72) Inventor: Ryan Zhang, Shanghai (CN)

(73) Assignee: Green Creative, LTD, Hong Kong (CN)

(*) Notice: Subject to any disclaimer, the term of this patent is extended or adjusted under 35 U.S.C. 154(b) by 0 days.

This patent is subject to a terminal disclaimer.

(21) Appl. No.: 18/831,051

(22) Filed: May 20, 2024

(65) Prior Publication Data

US 2025/0043939 A1 Feb. 6, 2025

Related U.S. Application Data

(63) Continuation of application No. 18/445,505, filed on Sep. 7, 2023.

(60) Provisional application No. 63/576,703, filed on Mar. 1, 2023.

(51) Int. Cl.

| | |
|---|---|
| ***F21V 15/01*** | (2006.01) |
| ***F21V 5/00*** | (2018.01) |
| ***F21V 17/10*** | (2006.01) |
| ***F21Y 115/10*** | (2016.01) |

(52) U.S. Cl.

CPC ................ *F21V 15/01* (2013.01); *F21V 5/00* (2013.01); *F21V 17/107* (2013.01); *F21Y 2115/10* (2016.08)

(58) Field of Classification Search

CPC .......... F21V 15/01; F21V 5/00; F21V 17/107; F21Y 2115/10

See application file for complete search history.

(56) References Cited

U.S. PATENT DOCUMENTS

| | | | | |
|---|---|---|---|---|
| 11,408,599 | B1 * | 8/2022 | Oross | F21V 21/30 |
| 2018/0335183 | A1 * | 11/2018 | Green | F21V 17/18 |
| 2020/0018453 | A1 * | 1/2020 | Chami | F21V 7/005 |
| 2024/0295307 | A1 * | 9/2024 | Zhang | F21V 5/00 |

* cited by examiner

*Primary Examiner* — Tracie Y Green

(74) *Attorney, Agent, or Firm* — James A. Gavney, Jr.; JAG Patent Service

(57) ABSTRACT

A LED light fixture comprising two LED light bays separated by a central compartment with a hinged access door, wherein each of the LED light bay includes LED light boards and optical diffuser panels. The optical diffuser panels of the LED light fixture are capable of being removed through the central compartment with the access door in an open position and the optical diffuser panels are secured within the light bays with the access door in a closed position.

15 Claims, 5 Drawing Sheets

LINEAR BAY LIGHT FIXTURE

RELATED APPLICATION

This Application is a continuation application of the co-pending U.S. patent application Ser. No. 18/445,505, filed on Sep. 9, 2023, and titled "HIGH-BAY LINEAR LIGHT FIXTURE" which claims priority under 35 U.S.C. § 119(e) from the U.S. provisional patent application Ser. No. 63/576,703, filed on Mar. 1, 2023, and titled "HIGH-BAY LINEAR LIGHT FIXTURE." The co-pending co-pending U.S. patent application Ser. No. 18/445,505, filed on Sep. 9, 2023, and titled "HIGH-BAY LINEAR LIGHT FIXTURE" and the provisional patent application Ser. No. 63/576,703, filed on Mar. 1, 2023, and titled "HIGH-BAY LINEAR LIGHT FIXTURE" are both hereby incorporated by reference.

FIELD OF THE INVENTION

The invention relates to the field of light fixtures. More specifically, this invention relates to linear bay light fixtures.

BACKGROUND OF THE INVENTION

LED lights are now the preferred alternative to fluorescent lamps, but they come in several varieties. Two of the most useful for large spaces with fairly high ceilings are high and low-bay lighting fixtures.

A bay light illuminates a large area. Application examples include warehouses, commercial buildings, retail locations, and gymnasiums. While there are two main categories of bay light fixtures, high and low-bay light fixtures, the primary characteristic used to tell them apart is ceiling height, but they have other similarities and differences.

High and low-bay lighting fixtures are both used to illuminate large areas and mounted onto high ceilings to provide stronger light while reducing glare. Ceiling height is the best way to compare high bay vs. low bay lighting. Low-bay fixtures only work with ceilings that are between 12-20 feet high, while high-bay light fixtures can illuminate ceilings that are 20-45 feet high.

The bay lighting fixtures also differ in strength. Low-bay lighting fixtures typically operate at or I below 100 watts, while high-bay lighting fixtures typically operate above 100 watts. High-bay and low-bay lighting fixtures also often use different hanging methods. Low-bay lighting fixtures are suspension mounted with chains or hooks, while high-bay lighting can hang from the ceiling using a hook, chain, or pendant or fixed more closely to a ceiling like a troffer light.

High-bay light fixtures are seen to have a larger range of applications than low-bay lighting fixtures, including industrial and manufacturing facilities, warehouses, gymnasiums, community or recreation centers, airport hangars, and department stores or other commercial buildings.

SUMMARY OF THE INVENTION

The present invention is directed to a linear bay light fixture that can be used for high-bay lighting applications and/or for low-bay lighting applications. The linear bay light fixture preferably has a body portion that forms two light bays that are separated by a central compartment for holding an LED driver and any other necessary electronics. The central compartment is accessible by an access door or access panel that is preferably hinged to a fixture body near the central compartment. The central compartment allows existing lenses or optical diffuser panels to be removed through the central compartment with the access door or access panel in an open position by sliding the lenses or optical diffuser panels in and out through the central compartment.

Each of the LED light bays is configured to hold an LED light boards, with or without additional optical elements, such as lenses. Optical diffuser panels that are positioned over the LED light boards are configured to slide into the central compartment on or along track features positioned around edges of each of the LED light bays to thereby expose underlying LED light boards or optical elements, when the access door or access panel is in the open position. When the optical diffuser panels are positioned or repositioned over the LED light boards, they are secured in this positions over the LED light boards with when the access door or access panel is in a closed position.

DETAILED DESCRIPTION OF THE INVENTION

Figure 2:
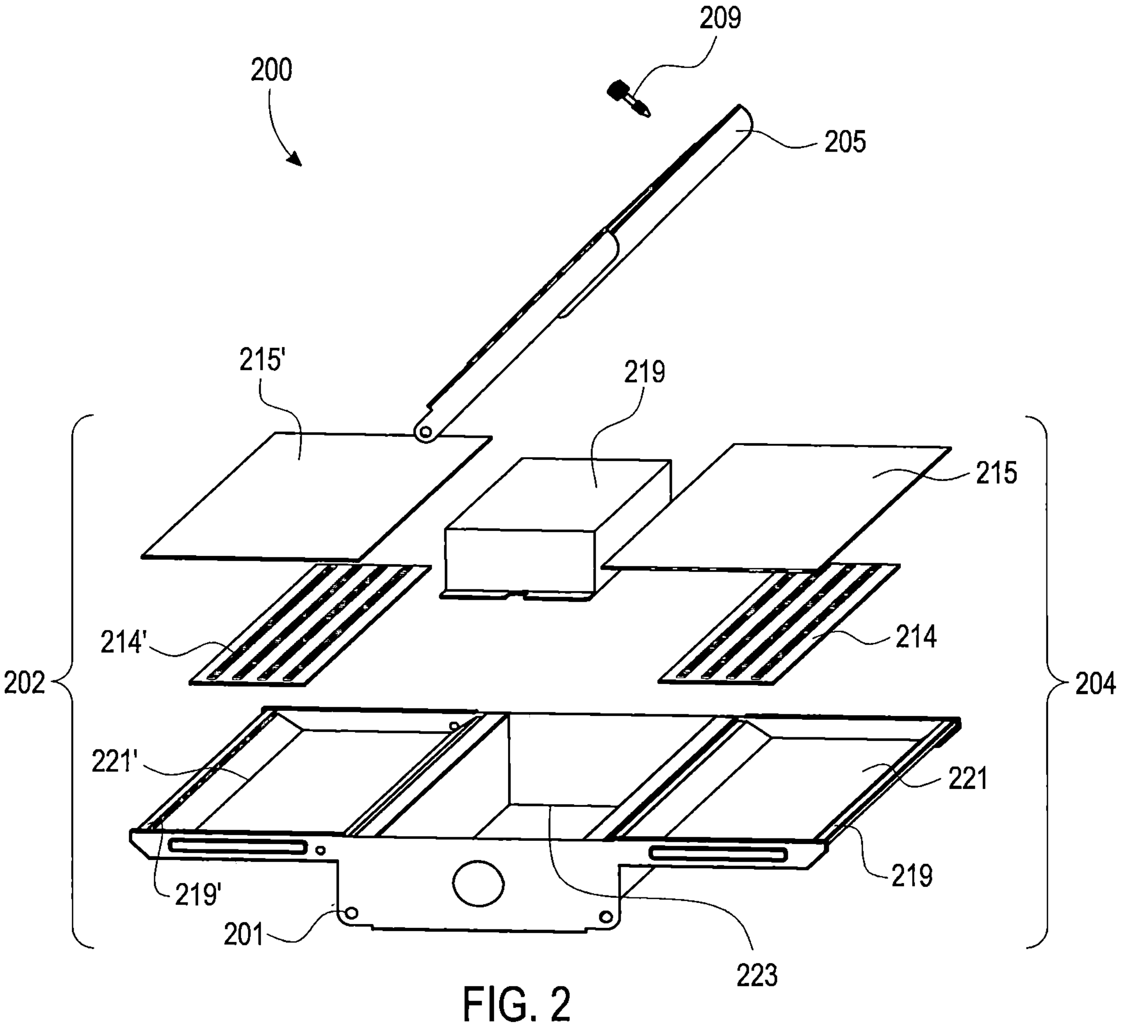
FIG. 2 shows exploded view of a linear bay light fixture with two light bays that are separated by a central compartment, in accordance with the embodiments of the invention.

The present invention is directed to a linear bay light fixture 100. The linear bay light fixture 100 has a rectangular form factor that includes a fixture body 101. The fixture body 101 includes two substantially rectangular light bays 102 and 104 that are separated by a central compartment 123 for holding an LED driver (219; FIG. 2) and any other necessary electronics, such as wiring and/or connections required to power and operate the linear bay light fixture 100. The linear bay light fixture 100 also includes hanger brackets 103 on side portions of the fixture body 101 for suspending the linear bay light fixture 100 from a ceiling.

Figure 1:
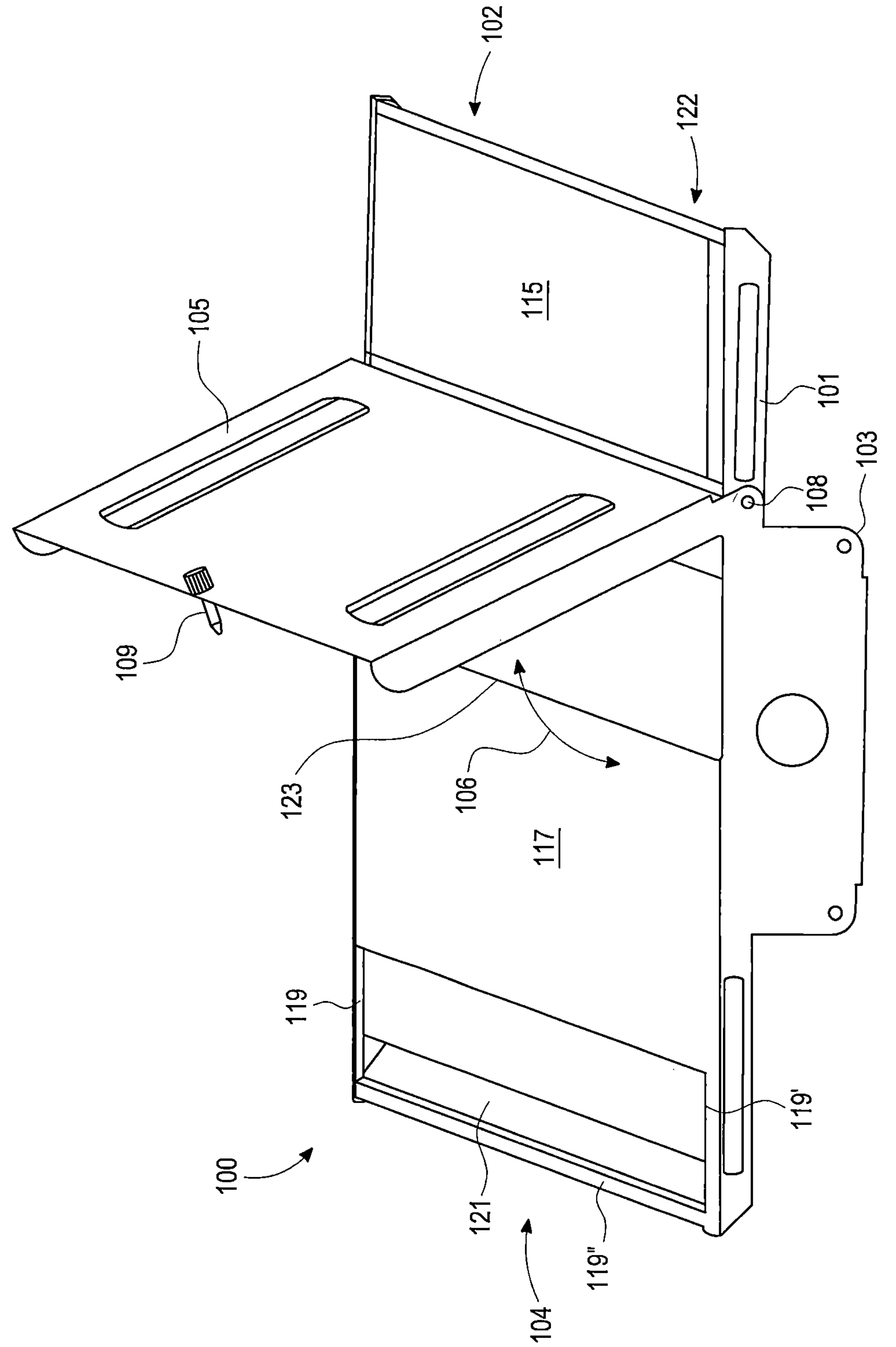
FIG. 1 shows a schematic representation of a linear bay light fixture with a central access door in an open position.

The linear bay light fixture 100 also has an access door 105 that is hingably attached to the fixture body 101, such that the access door 105 can be opened, as shown in FIG. 1, and closed as indicated by the arrow 106. The access door 105 has a securing mechanism or feature 109, such as a screw, that is used to secure the access door 105 in the closed position and to release the access door 105 from a portion of the fixture body 101 to thereby allow the access door 105 to swing into the open position through hinge features 108. It will be clear to one skilled in the art that the securing mechanism or feature 109 can be any suitable securing feature including, but not limited to, latch, snap and clip securing features.

Figure 5:
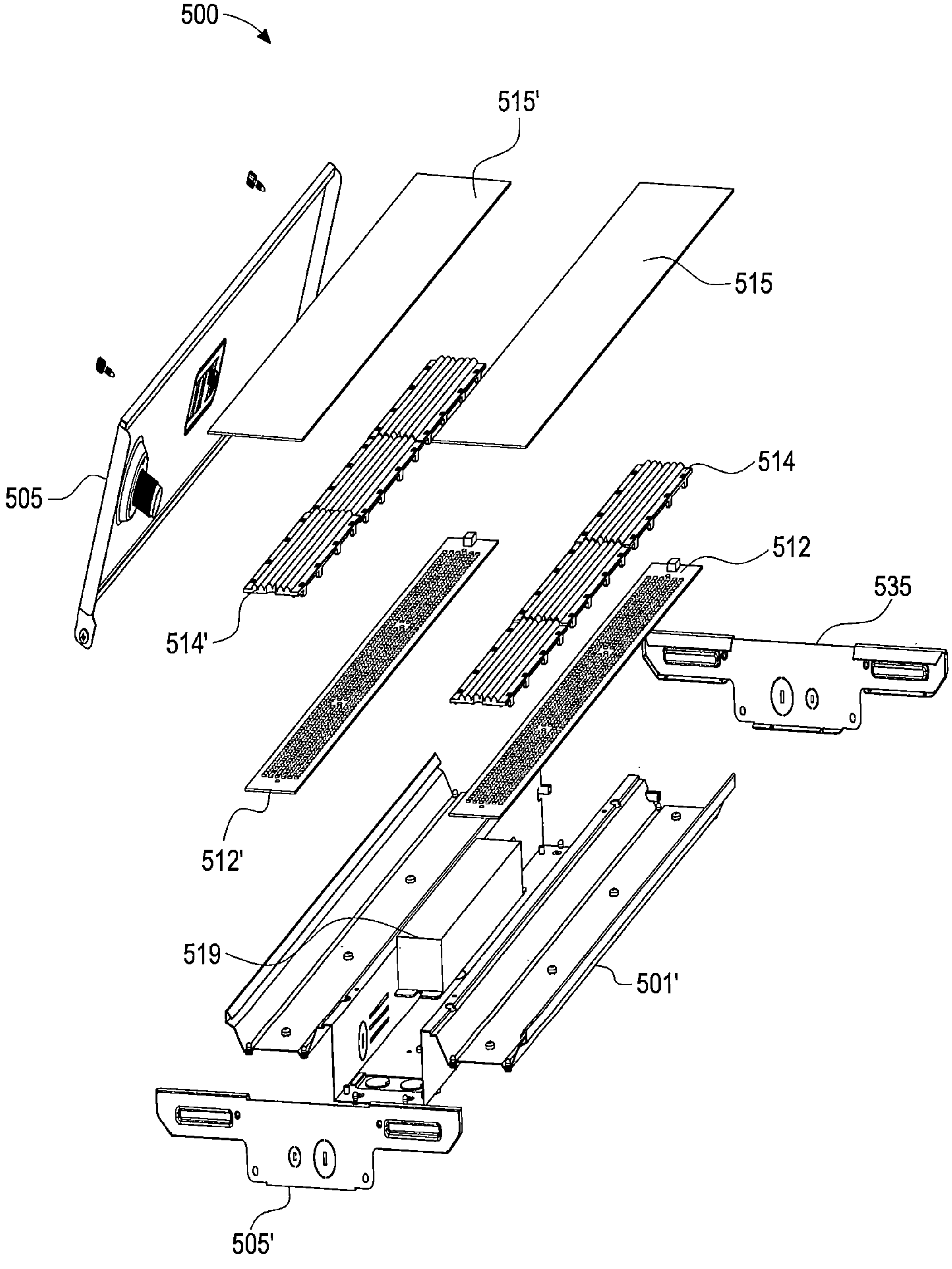
FIG. 5 shows and exploded view of a linear bay light fixture with optical elements in each of the two light bays, in accordance with the embodiments of the invention.

With the access door 105 in the open position the central compartment 123 can be accessed and optical diffuser panels 115 and 117 are capable of being removed. The optical diffuser panels 115 and 117 are removed by individual by sliding the optical diffuser panels 115 and 117 over the central compartment 123 and lifting the optical diffuser panels 115 and 117 out through the central compartment 123. With the optical diffuser panels 115 and 117 removed through the central compartment 123 or displaced over the central compartment 123, optical cavities 121 are open and exposed, such that the underlaying LED light boards (214 and 214') with or without optical elements (514 and 514'; FIG. 5) can be serviced or replaced. The same process, as described above, applies to replacing or servicing the optical diffuser panels 115 and 117.

The optical diffuser panels 115 and 117 are capable of being removed by individual sliding the optical diffuser panels 115 and 117 on track features positioned around or along edges of the LED light bays 102 and 104. With the optical diffuser panels 115 and 117 positioned over the optical cavities 121 and 122 of the LED light bays 102 and 104, the access door in the closed position and secured to through the securing mechanism or feature 109, the optical diffuser panels 115 and 117 are securely affixed to the linear bay light fixture 100.

FIG. 2 shows exploded view of a linear bay light fixture 200 with and fixture body 201 that form two light bays 202 and 204 which are separated by a central compartment 223. The two light bays 202 and 204 include two LED light boards 214' and 214 that fit into the optical cavities 221' and 221 of each of light bays 202 and 204, respectively. The linear bay light fixture 200 includes a and LED driver for powering the two LED light boards 214' and 214 and which fits into, and which is housed within the central compartment 223. The linear bay light fixture 200 also includes an access door 205 and a securing mechanism or features 209, such as the securing mechanism or feature 109 described above with reference to FIG. 1. With the linear bay light fixture 200 assembled and the access door in the closed position, optical diffuser panels 215' and 215 are secured and positioned over the LED light boards 214' and 214 through track features 219' and 219 that are located along edges of the each of the optical cavities 221' and 221 of the light bays 202 and 204.

FIG. 3 illustrates removing optical diffuser panels 315' and 315 from a linear bay light fixture to expose underlying LED boards 314' and 314 positioned within optical cavities 321' and 321 of each of the light bays 302 and 304 that are separated by a central compartment 323. In operation, the securing mechanism or securing feature 309 is manipulated to release the access door 305. The access door 305 is then placed the open position, as shown in FIGS. 3B-D, thereby exposing a LED driver 319 within the central compartment 323. In this configuration, the LED driver 319 can be serviced or replaced.

Figure 3A:
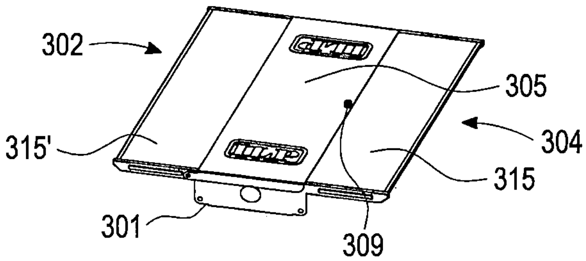
FIGS. 3A-D illustrates removing optical diffuser panels from a linear bay light fixture to expose underlying LED boards, in accordance with the embodiments of the invention.
Figure 3B:
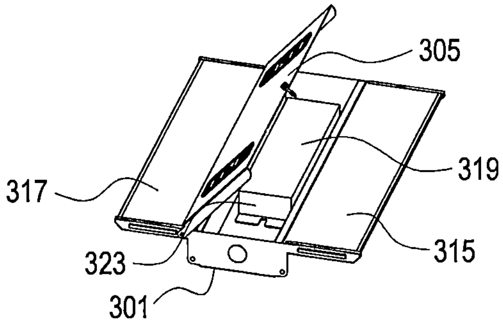
Figure 3C:
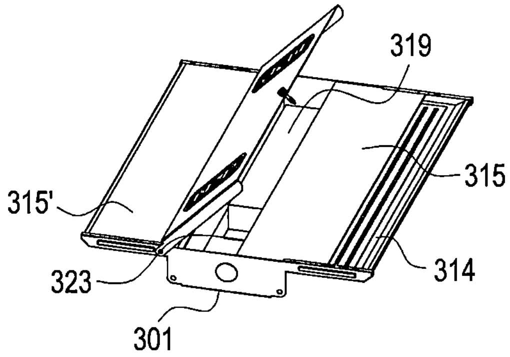
Figure 3D:
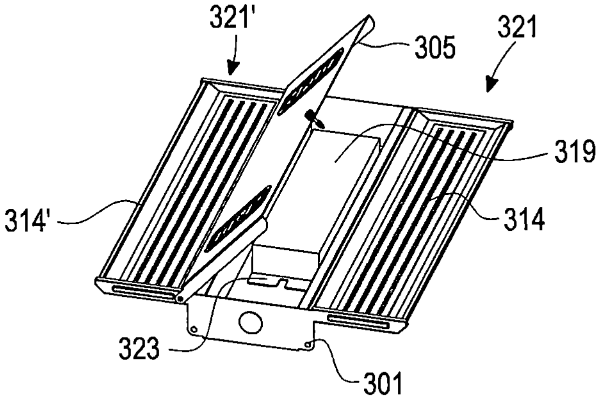

With the access door 305 in the open position, the optical diffuser panels 315' and 315 and be individually displaced to be positioned over the open central compartment 323 by individually sliding the optical diffuser panels 315' and 315 along track features positioned on edges of the optical cavities 321' and 321 of each of the light bays 302 and 304 and lifted off of the fixtures body 301 of the linear bay light fixture. With the optical diffuser panels 315' and 315 removed from a fixture body 301 of the linear bay light fixture as shown in FIG. 3D, the exposed and underlying LED boards 314' and 314 can be serviced or replace and/or the optical diffuser panels 315' and 315 can also be serviced or replaced.

Figure 4A:
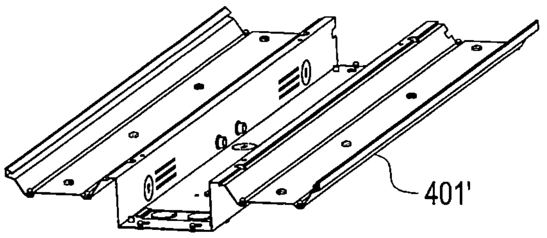
FIGS. 4A-C illustrate views of components used for making a fixture body of linear bay light fixture, in accordance with the embodiments of the invention.
Figure 4B:
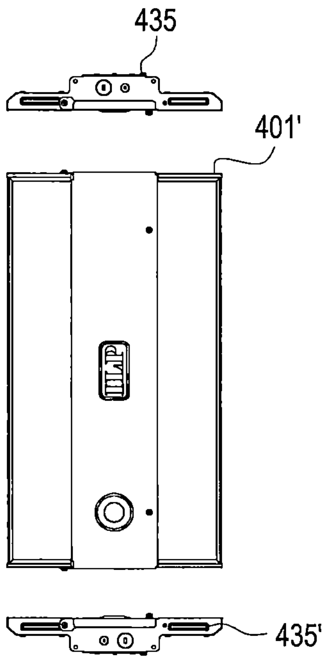
Figure 4C:
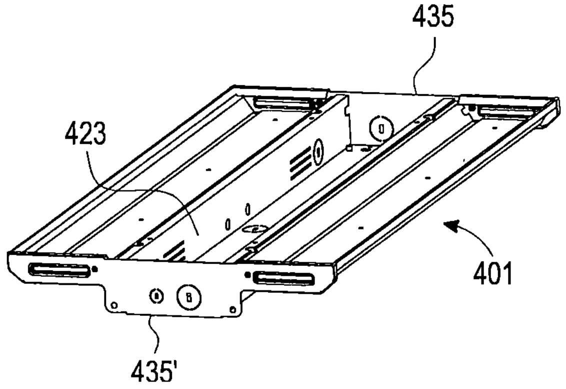

FIGS. 4A-C illustrate views of components for assembling a fixture body 401 used to make a linear bay light fixture. A central body portion 401' is formed from any suitable material or materials, such as aluminum or steel. For example, central body portion 401' is formed by bending and/or stamping and cutting sheet metal to form the central fixture body portion having two optical channels that are separated by a central channel portion. Side portions 435' and 435 of the fixture body 401 are preferably formed separately from the central body portion 401' by bending and/or stamping and cutting sheet metal to form the side portions 435' and 435 each with track features that allow the optical diffusion panels in an assembled linear bay light fixture to be mounted, displaced and/or removed through the central compartment 423, such as described above. The fixture body 401 is then formed by attached the side portions 435' and 435 to open channels ends of the central body portion 401' to form two optical cavities separated by a central compartment 423. The side portions 435' and 435 can be attached to open channel ends of the central body portion 401' using any suitable method including crimping methods, soldering methods, riveting methods or any combination thereof.

FIG. 5 shows an exploded view 500 of a linear bay light fixture with additional optical elements 514' and 514. The additional optical elements 514' and 514 are for example lenses that fit into optical channels a central body portion 501' and that eclipse LED light boards 512 and 512 that are also positioned within the optical channels the central body portion 501'. As described above, a fixture body is formed by attaching side portions 505' and 535 to open channels ends of the central body portion 501'.

The linear bay light fixture also includes an LED driver 519 that fits into a central compartment of the fixture body and optical diffuser panels 515' and 515 that are positioned over the optical cavities of the fixture body to for two light bays. The linear bay light fixture has an access door 505 that attaches to the fixture body, as previously described, and that allows the optical diffuser panels 515' and 515 to be removed through the central compartment of the fixture body with the access door in an open position.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A LED light fixture comprising two LED light bays separated by a central compartment with a hinged access door wherein each of the LED light bay includes LED light boards and optical diffuser panels and wherein the optical diffuser panels are capable of being removed through the central compartment with the access door in an open position and the optical diffuser panels are secured within the light bays with the access door in a closed position.

2. The LED light fixture of claim 1, further comprising a LED driver housed within the central compartment.

3. The LED light fixture of claim 1, further comprising lenses positioned between the LED light boards and the optical diffuser panels.

4. The LED light fixture of claim 1, wherein the two LED light bays include track features along edges the two LED light bays for securing the optical diffuser panels over the LED light boards.

5. The LED light fixture of claim 1, further comprising a securing mechanism or securing feature for holding the access door in the closed position.

6. A LED light fixture comprising:

a) a fixture body with optical cavities separated by a central compartment;

b) LED light boards within the optical cavities;

c) optical diffuser panels supported through track features along edges of the optical cavities; and d) an access door attached to the fixture body through hinge features, such that the access door can be opened to expose the central compartment and the optical diffuser panels can be removed by sliding the optical diffuser panels individually into the central compartment with the access door in an open position.

7. The LED light fixture of claim 6, further comprising a LED driver housed within the central compartment.

8. The LED light fixture of claim 6, further comprising lenses positioned between the LED light boards and the optical diffuser panels.

9. The LED light fixture of claim 6, wherein the optical cavities include track features along edges of the optical cavities for securing the optical diffuser panels over the LED light boards.

10. The LED light fixture of claim 6, further comprising a securing mechanism or securing feature for holding the access door in a closed position.

11. A LED light fixture comprising:

a) a central body portion with two optical channels separated by a central channel;

b) side portions that attached to open channel ends of the central body portion to form a fixture body having two optical cavities separated by a central compartment;

c) LED light boards positioned within the optical cavities and optical diffuser panels that slide over the LED light boards through track features along edges of the optical cavities; and d) an access door that is configured to secure to the fixture body in a closed position and over the central compartment and thereby secure the optical diffuser panels in positions over the LED light boards.

12. The LED light fixture of claim 11, further comprising and LED driver housed within the central compartment.

13. The LED light fixture of claim 11, further comprising lenses positioned between the LED light boards and the optical diffuser panels.

14. The LED light fixture of claim 11, wherein the optical cavities include track for securing the optical diffuser panels over the LED light boards.

15. The LED light fixture of claim 11, further comprising a securing mechanism or securing feature for holding the access door in a closed position.

* * * * *